(12) United States Patent
Abedini et al.

(10) Patent No.: US 11,784,705 B2
(45) Date of Patent: Oct. 10, 2023

(54) TECHNIQUES FOR PARTIAL CONFIGURATION OF AUTONOMOUSLY SMART RELAY DEVICES

(71) Applicant: QUALCOMM Incorporated, San Diego, CA (US)

(72) Inventors: Navid Abedini, Basking Ridge, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/219,093

(22) Filed: Mar. 31, 2021

(65) Prior Publication Data

US 2022/0321199 A1    Oct. 6, 2022

(51) Int. Cl.
| | | |
|---|---|---|
| H04B 7/15 | (2006.01) | |
| H04B 7/155 | (2006.01) | |
| H04L 41/0813 | (2022.01) | |
| H04W 24/02 | (2009.01) | |

(52) U.S. Cl.
CPC ......... H04B 7/155 (2013.01); H04L 41/0813 (2013.01); H04W 24/02 (2013.01)

(58) Field of Classification Search
CPC .................................. H04B 7/155; H04B 7/01
See application file for complete search history.

(56) References Cited

U.S. PATENT DOCUMENTS

| | | | |
|---|---|---|---|
| 2010/0182916 A1* | 7/2010 | Drewes ................ | H04B 7/2606 370/252 |
| 2014/0211701 A1* | 7/2014 | Damnjanovic ......... | H04L 5/005 370/329 |
| 2020/0280355 A1 | 9/2020 | Abedini et al. | |
| 2021/0075497 A1* | 3/2021 | Tekgul .................. | H04W 40/04 |
| 2021/0195674 A1* | 6/2021 | Park .................... | H04B 7/15557 |

OTHER PUBLICATIONS

International Search Report and Written Opinion—PCT/US2022/070873—ISA/EPO—dated Jun. 3, 2022.

* cited by examiner

*Primary Examiner* — Sulaiman Nooristany
(74) *Attorney, Agent, or Firm* — Arent Fox Schiff LLP

(57) ABSTRACT

Techniques for partial configuration of an autonomously smart repeater may allow a control entity (e.g., base station, UE, or cloud software/algorithm) to configure the autonomously smart repeater and thereby improve end-to-end performance for some communications. In an example, a relay device may receive, from a first entity, an indication for reconfiguring a parameter corresponding to an autonomous reconfiguration procedure of the relay device. The relay device may configure a setting of the autonomous reconfiguration procedure according to the parameter. The relay device may forward a signal between a first wireless device and a second wireless device based on the configuring.

13 Claims, 8 Drawing Sheets

TECHNIQUES FOR PARTIAL CONFIGURATION OF AUTONOMOUSLY SMART RELAY DEVICES

BACKGROUND

Aspects of the present disclosure relate generally to wireless communications, and more particularly, to techniques for partial configuration of autonomously smart relay devices.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a relay device is provided. The method may include receiving, from a first entity, an indication for reconfiguring a parameter corresponding to an autonomous reconfiguration procedure of the relay device. The method may also include configuring a setting of the autonomous reconfiguration procedure according to the parameter. The method may also include forwarding a signal between a first wireless device and a second wireless device based on the configuring.

In another aspect, a method of wireless communication by a control entity is provided. The method may include determining to reconfigure a setting corresponding to an autonomous reconfiguration procedure of a relay device for forwarding a signal between a first wireless device and a second wireless device. The method may include transmitting, to the relay device, an indication for reconfiguring the setting corresponding to the autonomous reconfiguration procedure.

In another aspect, a relay device is provided. The relay device may include a memory storing instructions, and a processor communicatively coupled with the memory. The processor may be configured to receive, from a first entity, an indication for reconfiguring a parameter corresponding to an autonomous reconfiguration procedure of the relay device. The processor may be configured to configure a setting of the autonomous reconfiguration procedure according to the parameter. The processor may be configured to forward a signal between a first wireless device and a second wireless device based on the configuring.

In another aspect, a control entity is provided. The control entity may include a memory storing instructions, and a processor communicatively coupled with the memory. The processor may be configured to determine to reconfigure a setting corresponding to an autonomous reconfiguration procedure of a relay device for forwarding a signal between a first wireless device and a second wireless device. The processor may be configured to transmit, to the relay device, an indication for reconfiguring the setting corresponding to the autonomous reconfiguration procedure.

In other aspects, apparatuses and computer-readable mediums for performing these methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
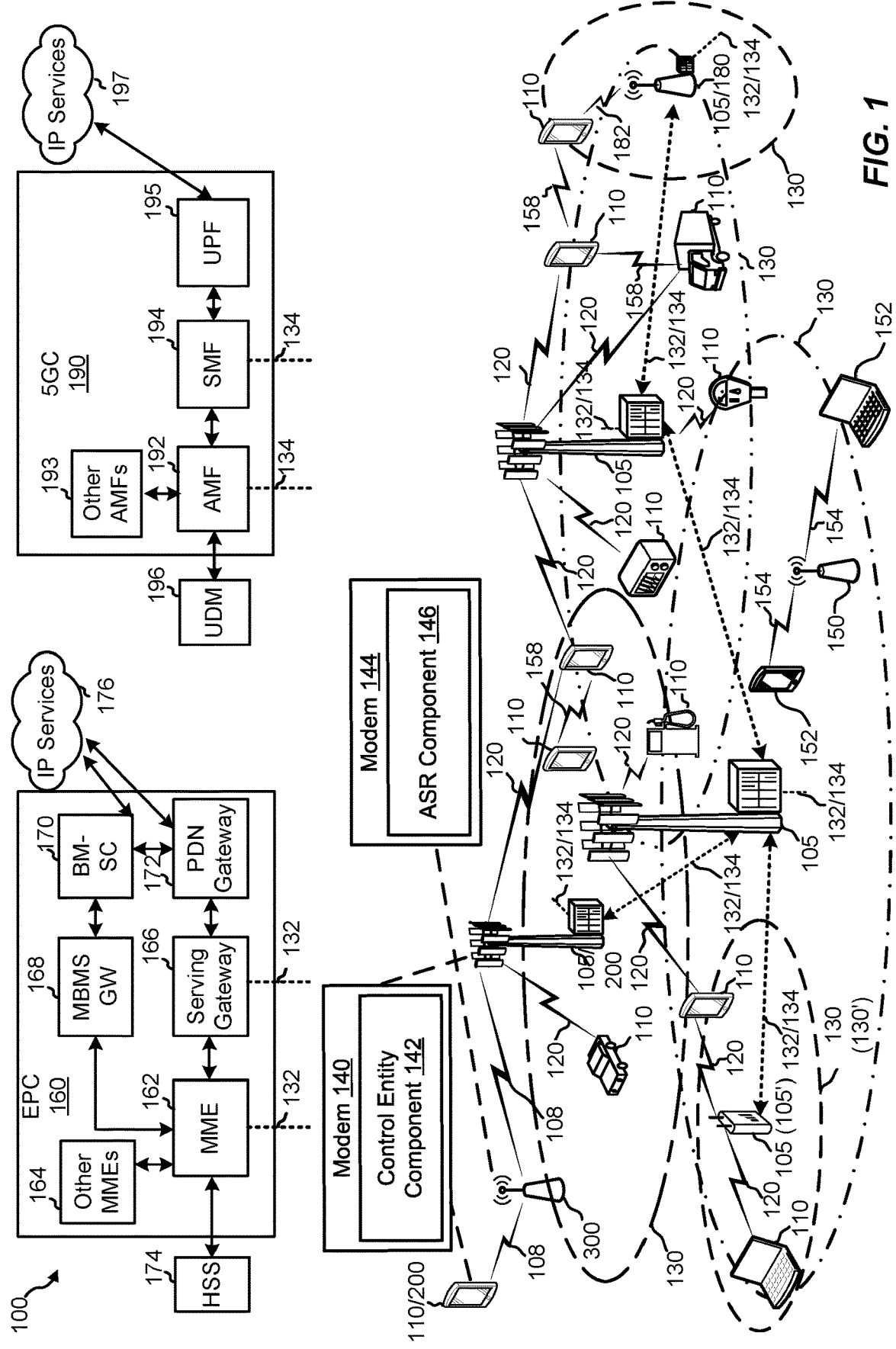
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A conventional repeater merely amplifies and forwards communications between wireless nodes (e.g., base station and user equipment (UE)) to improve network coverage. An autonomously smart repeater may acquire or infer some information to decode broadcast channels of communications and thereby improve performance of the repeater as compared to a conventional repeater. In some situations, the autonomously smart repeater may reconfigure one or more of its own parameters based on a decoded broadcast channel to improve relay performance. However, as described herein, this may lead to undesired end-to-end performance of communications.

The present disclosure provides techniques for partial configuration of an autonomously smart repeater which may allow a control entity (e.g., base station, UE, or cloud software/algorithm) to configure the autonomously smart repeater to improve end-to-end performance for some communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In some implementations, a relay device 300 may relay (or repeat) communications via communication links 108 between wireless communication devices (e.g., UE 110 and base station 105). The communication links 108 may include uplink (UL) communications, downlink (DL) communications, device-to-device (D2D) communications, or any other type of communication, as described herein, depending on the type of device used as the relay device 300. In an aspect, a control entity (e.g., UE 110 or base station 105) may include a modem 140 and/or a control entity component 142 for partially configuring an autonomously smart repeater device (e.g., relay device 300). Further, the relay device 300 may include a modem 144 and/or a autonomously smart repeater (ASR) component 146 for configuring one or more parameters of the relay device 300 based on an indication from the control entity 200 to improve end-to-end performance of communications.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include UL (also referred to as reverse link) transmissions from a UE 110 to a base station 105 and/or DL (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using D2D communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
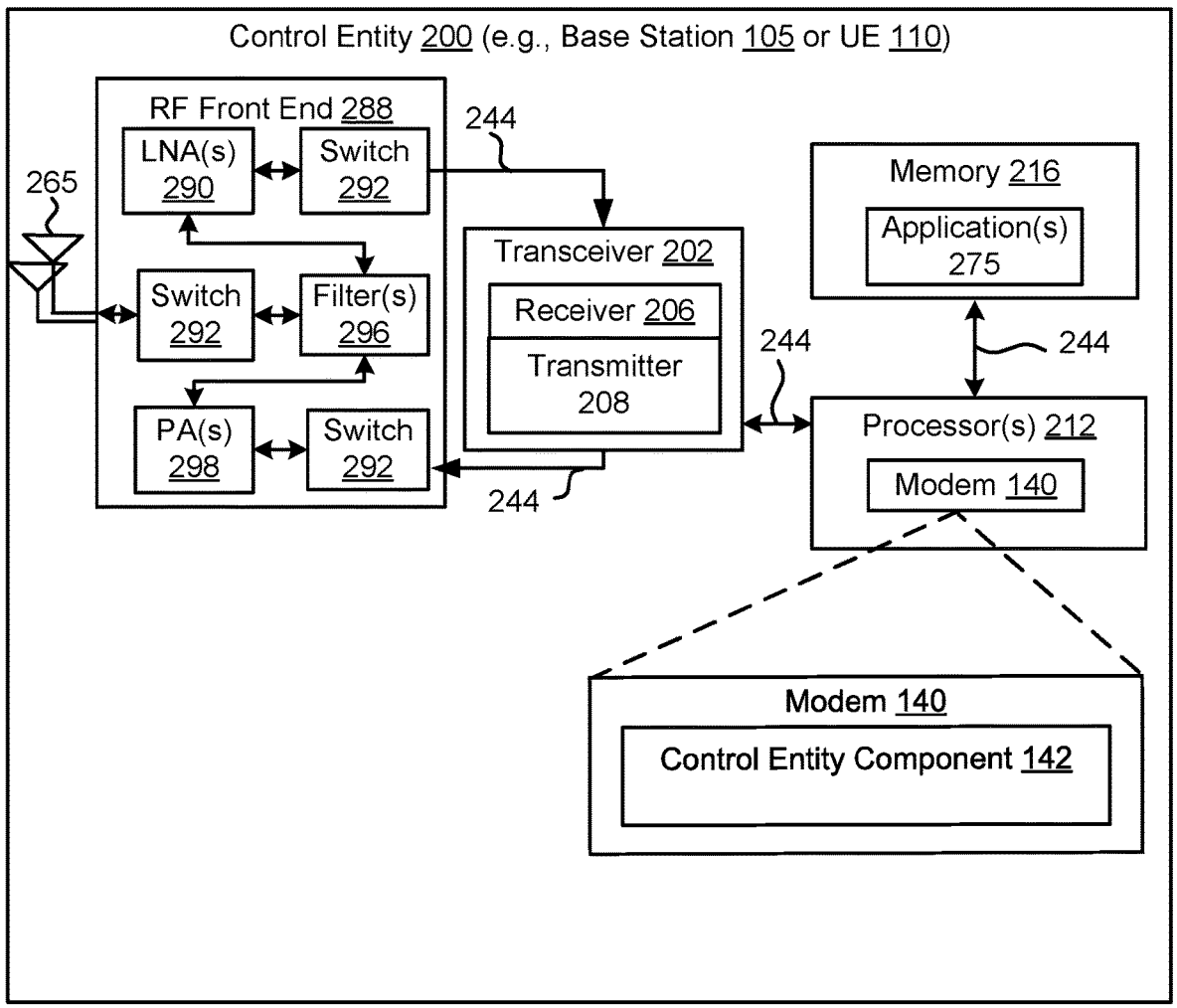
FIG. 2 is a schematic diagram of an example of a control entity of FIG. 1, according to aspects of the present disclosure.

Referring to FIG. 2, an example implementation of a control entity 200 (e.g., UE 110 or base station 110) may include the modem 140 having the control entity component 142. The modem 140 and/or the control entity component 142 of the control entity 200 may be configured to partially configure autonomously smart repeaters, as described in further detail herein.

In some implementations, the control entity 200 may include a variety of components, including components such as one or more processors 212 and memory 216 and transceiver 202 in communication via one or more buses 244, which may operate in conjunction with the modem 140 and/or the control entity component 142 to enable one or more of the functions related to partial configuration of autonomously smart repeaters, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the control entity component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the control entity 200 along with the processors 212. In other aspects, some of the features of the one or more processors 212 and/or the modem 140 associated with the control entity component 142 may be performed by the transceiver 202.

Also, the memory 216 may be configured to store data used herein and/or local versions of applications 275 or the control entity component 142 and/or one or more subcomponents of the control entity component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the control entity component 142 and/or one or more of its subcomponents, and/or data associated therewith, when the control entity 200 is operating at least one processor 212 to execute the control entity component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the control entity 200 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the control entity 200 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the control entity 200 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the control entity 200 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on control entity configuration information associated with the control entity 200 as provided by the network (e.g., base station 105).

Figure 3:
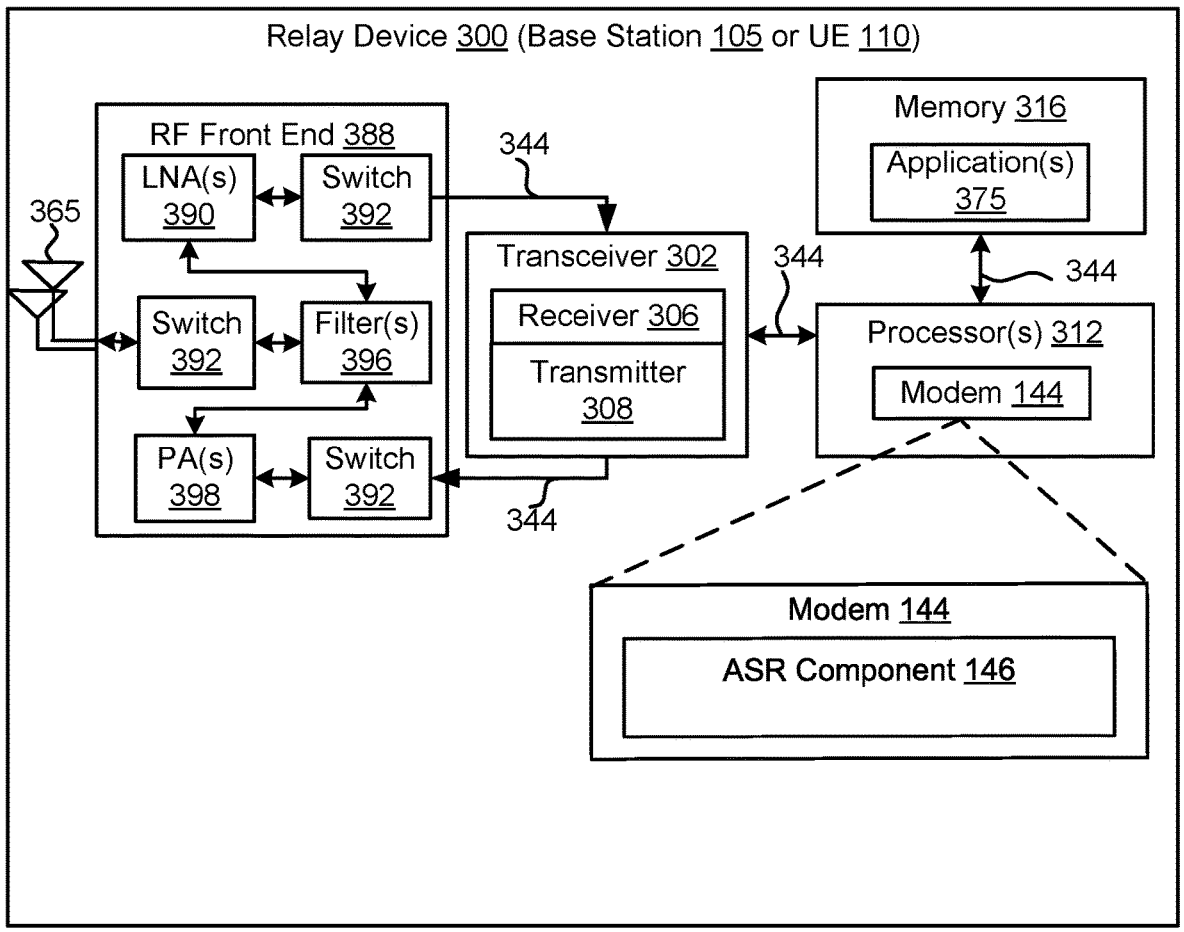
FIG. 3 is a schematic diagram of an example of a relay device of FIG. 1, according to aspects of the present disclosure.

Referring to FIG. 3, an example implementation of a relay device 300 (e.g., base station 105 or UE 110) may include a modem 144 having the ASR component 146. The modem 144 and/or the ASR component 146 of the relay device 300 may be configured to implement functions of partial configuration of the relay device 300 based on indications from the control entity 200, as described in further detail herein.

In some implementations, the relay device 300 may include a variety of components, including components such as one or more processors 312 and memory 316 and transceiver 302 in communication via one or more buses 344, which may operate in conjunction with the modem 144 to enable one or more of the functions related to partial configuration of autonomously smart repeaters, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions of the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the base station 105 and the processors 312. In other aspects, some of the features of the one or more processors 312 and/or the modem 144 may be performed by the transceiver 302.

Also, the memory 316 may be configured to store data used herein and/or local versions of applications 375, and/or one or more subcomponents of the modem 144 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 144 and/or one or more of the subcomponents, and/or data associated therewith, when the base station 105 is operating at least one processor 312 to execute the modem 144 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the relay device 300 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the relay device 300 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the relay device 300 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the relay device 300 (e.g., RF front end 388, transceiver 302) to enable transmission and/or reception of signals from the network based on a specified modem configuration. In an aspect, the modem configuration may be based on the mode of the modem 144 and the frequency band in use. In another aspect, the modem configuration may be based on a repeater configuration associated with the relay device 300.

In general, a repeater is a particular type of relay node configured for amplify-and-forward operations between two wireless nodes, (e.g. base station 105 and UE 110). A repeater may be a simple and cost-effective way to improve network coverage. Other relay nodes may include, for example, a decode-and-forward relay node (e.g., integrated access and backhaul (IAB)-node).

In some aspects, side information may improve performance of repeater. The side information may include, for example, timing information (e.g., slot/symbol/subframe/frame boundary), time division duplex (TDD) UL/DL configuration, ON-OFF scheduling, or spatial information for beam management).

An example of a repeater may include a traditional repeater that does not receive any side information. Another example of a repeater may include an autonomously smart repeater that acquires or infers at least part of the side information by itself. For example, an autonomously smart repeater may acquire the information by receiving/decoding broadcast channels.

Both traditional repeaters and autonomously smart repeaters may easily be implemented in a network as both may be deployed in a transparent way to network nodes. Further, both may be deployed strategically and, may be manually configured at a time of deployment in order to achieve a desired performance. As a result of these repeaters, network nodes may transparently benefit from improved performance.

Figure 4:
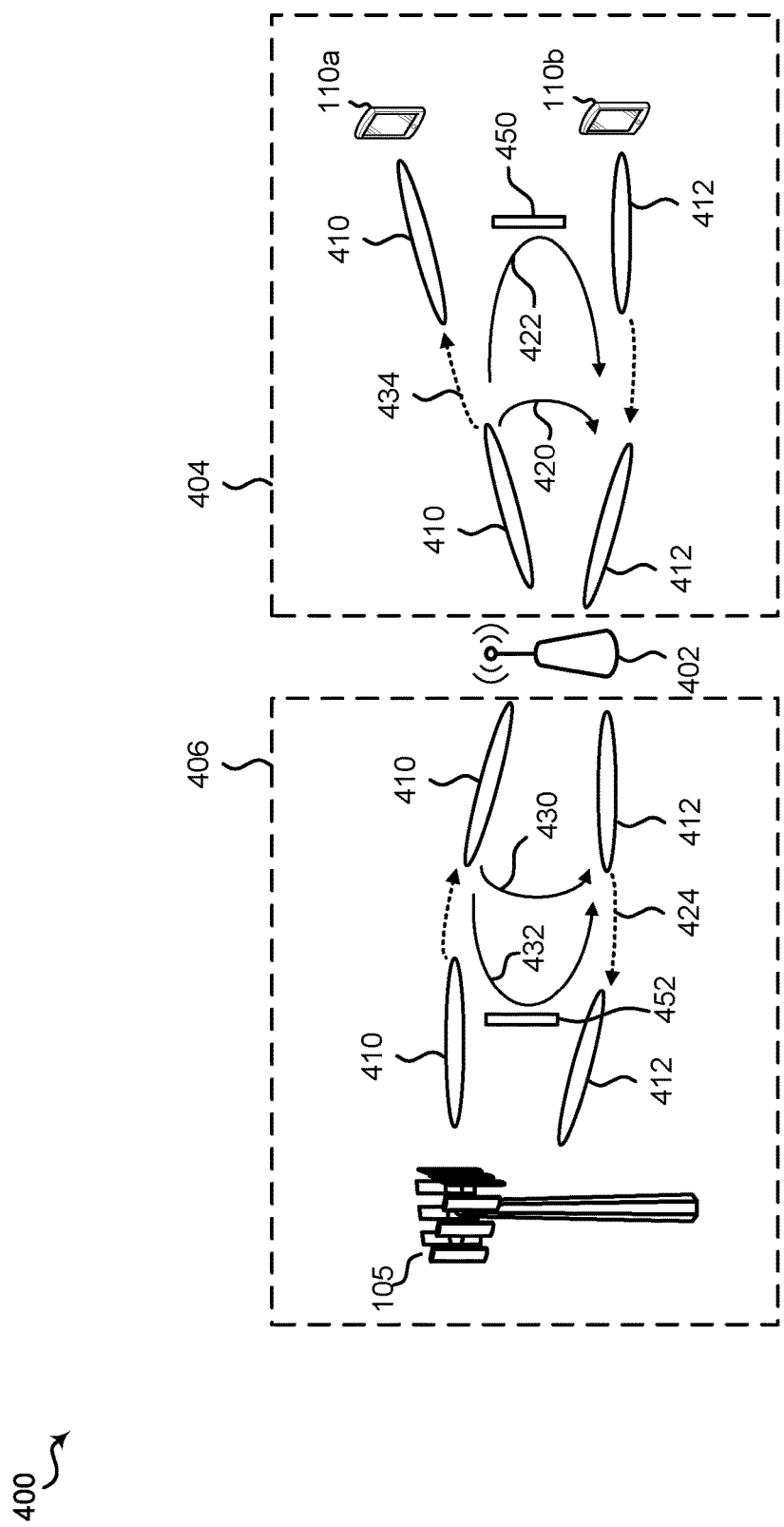
FIG. 4 is a conceptual diagram of an example of communications being forwarded by a relay device of FIG. 1, according to aspects of the present disclosure.

In some aspects, a repeater may autonomously determine to reconfigure some of its parameters to improve its own performance. However, this may lead to undesired end-to-end performance of communications. As an example, referring to FIG. 4, an example repeater network 400 may include a repeater 402 that forwards signals between a base station 105 and one or more UEs 110a and 110b. The repeater 402 may perform bidirectional forwarding which allows DL signals 410 (or beams) to be forwarded from the base station 105 to the UE 110a, and UL signals 412 (or beams) to be forwarded from the UE 110b to the base station 105. However, bidirectional forwarding may result in different interference issues.

In an example, local coupling 420 from the DL signal 410 to the UL signal 412 on a UE-side 404 of the repeater 402 or remote reflection 422 (e.g., clutter echo) caused by a reflective object 450 may lead to a delayed self-interference 424 on the UL signal 412 on the base station side 406 of the repeater 402.

In another example, local coupling 430 from the UL signal 412 to the DL signal 410 on a base station-side 406 of the repeater 402 or remote reflection 432 (e.g., clutter echo) caused by a reflective object 452 may result in a delayed cross-link interference 434 on the DL signal 412 on the UE-side 404 of the repeater 402.

Figure 5:
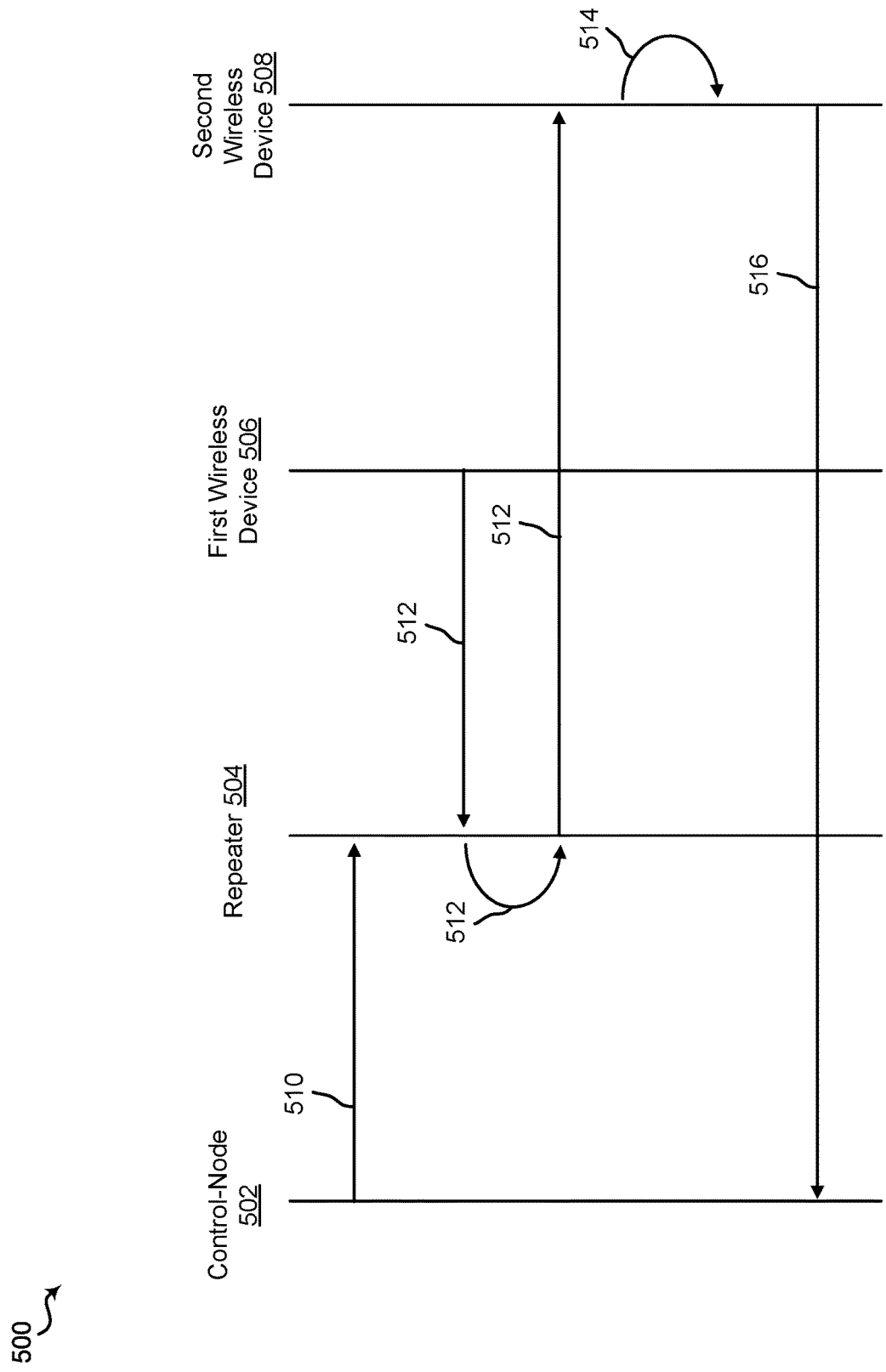
FIG. 5 is a conceptual diagram of an example of an interference correction operation of a base station, according to aspects of the present disclosure.

In some aspects, nodes within the repeater network attempt to correct interference through measurements. For example, referring to FIG. 5, a control node 502 (e.g., base station 105 in FIG. 4) may configure bidirectional forwarding, along with pairs of transmission/receiving beams and power settings, by sending a configuration message 510 to the repeater 504 (e.g., repeater 402). When a first wireless device 506 (e.g., UE 110a) transmits a signal 512, the repeater 504 may forward the signal 512 to a second wireless device 508 (e.g., UE 110b) to do signal-interference and/or cross-link interference measurements 514. The second wireless device 508 may then transmit a measurement report 516 to the control node 502, which may use interference values from the measurement report 516 for interference correction.

If the repeater 504 is an autonomously smart repeater, TDD information (e.g., via doing power detection in DL and/or UL direction) may be used for autonomous reconfiguration. If the repeater 504 does not detect an incoming signal (e.g., the measured power in that direction is less than a threshold), the repeater 504 may disable the forwarding operation in the corresponding direction (or does so with lowered amplification gain), which may prevent the control node 502 from doing interference correction. For example, if the repeater 504 will be used for bidirectional forwarding, a signal may need to be measured/managed for resulting self-interference or cross-link interference. Prior measurements and mitigation (e.g., in terms of power setting or beam management) would therefore be needed. On resources (e.g. UL resources), where interference (e.g., cross-link interference) is to be measured, the repeater 504 may detect there is no incoming signal in one direction (e.g., DL direction) and therefore stops forwarding signals in that direction (e.g., DL direction) or change the power configuration. Therefore, the measurements may not be accurate or relevant.

In an aspect, some signals (e.g., synchronization signal block (SSB) or channel status information reference signal (CSI-RS)) are periodically transmitted to provide opportunities for channel/beam measurements or mobility management. From a receiving point of view, the transmission power of these signals should be kept constant. Further, there may be quasi-colocation (QCL) relationship assumed for some of these signals. For example, SSBs with the same index and across periodic are assumed to be spatially QCLed. However, if a repeater (e.g., repeater 402 or 504) autonomously adjusts its forwarding transmission power and/or receiving/transmission beams, the receiver device may not efficiently use these signals for its measurements.

In another example, the transmission of a signal that spans multiple symbols and/or slots may be assumed to maintain phase continuity. This assumption is necessary at the receiving device to be able to estimate a channel using transmitted pilots (e.g., demodulation reference signal (DMRS)) and do proper channel equalization and processing. However, if the repeater (e.g., repeater 402 or 504) adjusts some of its configuration, the repeater may introduce some random phase, resulting in loss of phase continuity.

Aspects of the present disclosure, provide techniques for partial configuration of an autonomously smart repeater by, for example, disabling an autonomous reconfiguration in a subset of resources. In an example, a first set of resources within which the repeater is allowed (or not) to perform autonomous reconfiguration. For example, the indication may indicate to turn ON-OFF the repeater, activate/deactivate amplification chains, select transmission/receiving beam forming configuration, or configure power amplification settings. In an example, a type of reconfiguration and an associated restriction can be indicated to the repeater. In another example, the repeater may receive an indication to maintain phase continuity for a given set of consecutive symbols/slots. In yet another example, the repeater may receive an indication to maintain spatial QCL relations (e.g., adopted transmission/receiving beams) across a set of symbols or slots.

Figure 6:
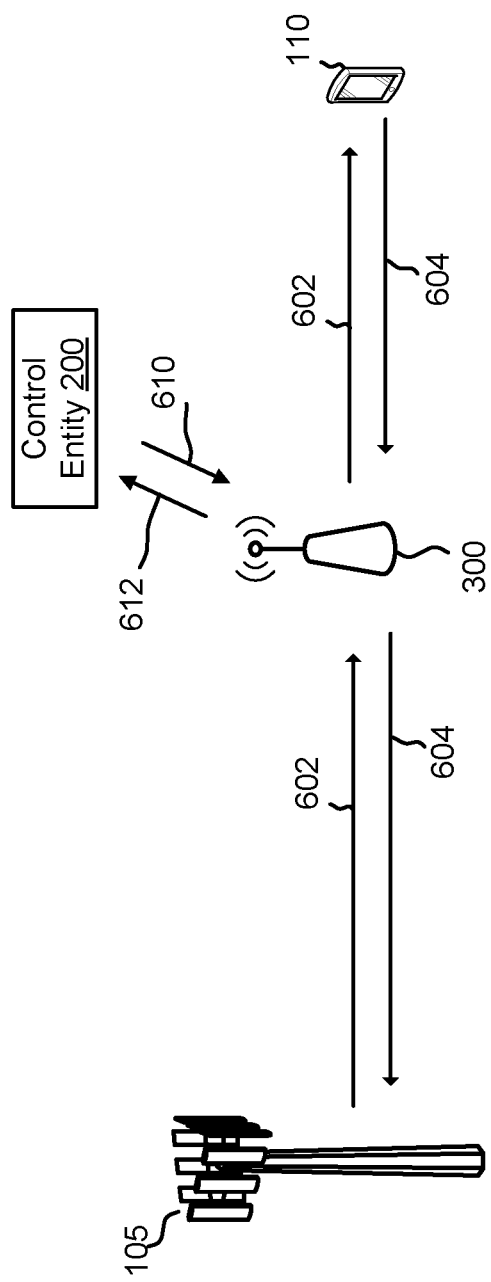
FIG. 6 is a conceptual diagram of another example of communications being forwarded by a relay device of FIG. 1, according to aspects of the present disclosure.

Referring to FIG. 6, in an example, the relay device 300 may forward the signals 602 and 604 between the base station 105 to the UE 110. To forward one of the signals, the relay device 300 may receive an indication 610 for reconfiguring a parameter corresponding to an autonomous reconfiguration procedure of the relay device 300 from the control entity 200.

In an example, the relay device 300 may be any device, including a UE 110 or a base station 105, that performs autonomously smart repeating, and the control entity 200 may include any device, including a control node, a network-node, the base station 105, or the UE 110, that may provide an indication to the repeater 300. This means, the control entity 200 may be performed by the base station 105 or the UE 110 receiving or transmitting the signals 602 or 604 that is forwarded by the repeater 300. Thus in FIG. 6, the control entity 200 is illustrated as being a separate device from the base station 105 or the UE 110. However, in another example, the base station 105 or the UE 110 may include the control entity 200. Thus, the indication 610 may be provided to the relay device 300 by a separate device/entity, as illustrated in FIG. 6, or provided by the base station 105 or the UE 110 within the signal to be forwarded (e.g., within signals 602 or 604), or in a separated signal to the relay device 300.

In an example, the relay device 300 may transmit a capabilities message 612 to the control entity 200 to indicate capabilities of the relay device 300 for configuring autonomous reconfiguration procedures.

Figure 7:
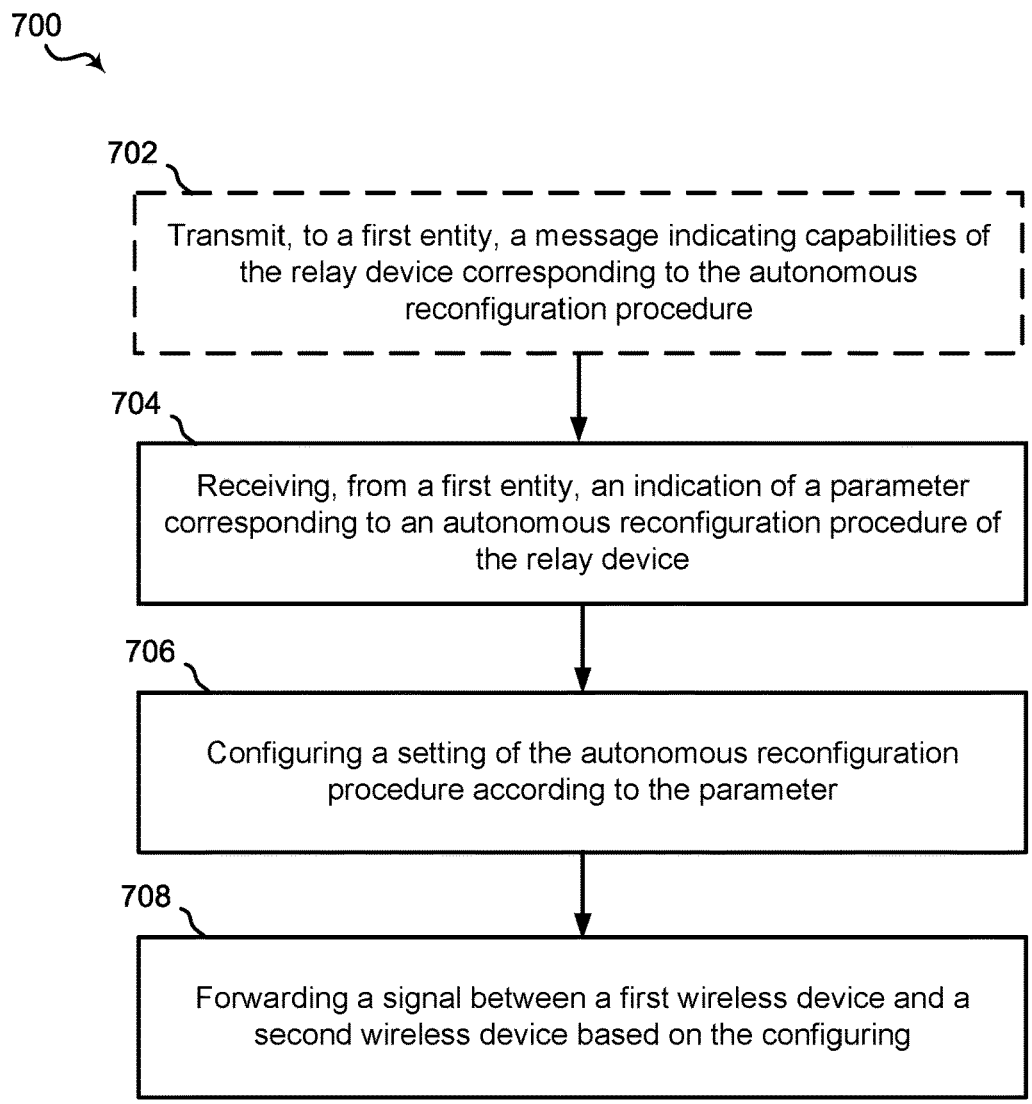
FIG. 7 is flowchart of an example method performed by a relay device of FIG. 1, according to aspects of the present disclosure.

Referring to FIG. 7, an example of a method 700 for partial configuration of an autonomously smart repeater may be performed by the ASR component 146, the modem 144, the transceiver 302, the processor 312, the memory 316, and or any other component/subcomponent of the relay device 300 of the wireless communication network 100.

At block 702, the method 700 may optionally include transmitting, to the first entity, a message indicating capabilities of the relay device corresponding to the autonomous reconfiguration procedure. For example, the ASR component 146, the modem 144, the transceiver 302, the processor 312, and/or the memory 316 of the relay device 300, and/or one or more additional components/subcomponents of the relay device 300 may be configured to or may comprise means for transmitting, to the first entity, a message indicating capabilities of the relay device corresponding to the autonomous reconfiguration procedure.

For example, the transmitting the message by the relay device 300 at block 702 may include transmitting, to the control entity 200, a message 612 indicating capabilities of the relay device 300 corresponding to the autonomous reconfiguration procedure.

At block 704, the method 700 may include receiving, from a first entity, an indication of a parameter corresponding to an autonomous reconfiguration procedure of the relay device. For example, the ASR component 146, the modem 144, the transceiver 302, the processor 312, and/or the memory 316 of the relay device 300, and/or one or more additional components/subcomponents of the relay device 300 may be configured to or may comprise means for receiving, from a first entity, an indication of a parameter corresponding to an autonomous reconfiguration procedure of the relay device.

For example, the receiving the indication by the relay device 300 at block 704 may include receiving, from the control entity 200, an indication 610 for reconfiguring a parameter corresponding to an autonomous reconfiguration procedure of the relay device 300.

In an example, the indication 610 may be based on the capabilities of the relay device indicated by the message 612. In an example, the indication 610 may be indicated in a designated set of resources of a signal. In another example, the indication 610 may be indicated in a signal to be forwarded by the relay device 300.

At block 706, the method 700 may include configuring a setting of the autonomous reconfiguration procedure according to the parameter. For example, the ASR component 146, the modem 144, the transceiver 302, the processor 312, and/or the memory 316 of the relay device 300, and/or one or more additional components/subcomponents of the relay device 300 may be configured to or may comprise means for configuring a setting of the autonomous reconfiguration procedure according to the parameter.

For example, the configuring the setting by the relay device 300 at block 706 may include configuring by the ASR component 146, the modem 144, the processor 312, the transceiver 302, and/or the memory 316 of the relay device 300, a setting of the autonomous reconfiguration procedure according to the parameter.

In an example, configuring the setting may include enabling or disabling the autonomous reconfiguration procedure, activating or deactivating an amplification chain of the repeater, selecting a transmission beamforming configuration or a receiving beamforming configuration, or modifying a power amplification setting.

In another example, configuring the setting may include configuring or maintaining a phase continuity setting. In an example, configuring the setting may include configuring or maintaining a quasi-colocation relation setting.

In another example, the ASR component 146, the modem 144, the processor 312, the transceiver 302, and/or the memory 316 of the relay device 300 may receive a second indication of a set of consecutive symbols or slots for maintaining a configuration of the setting may be received, and maintain the setting based on the second indication.

At block 708, the method 700 may include forwarding a signal between a first wireless device and a second wireless device based on the configuring. For example, the ASR component 146, the modem 144, the transceiver 302, the processor 312, and/or the memory 316 of the relay device 300, and/or one or more additional components/subcomponents of the relay device 300 may be configured to or may comprise means for forwarding a signal between a first wireless device and a second wireless device based on the configuring.

For example, the forwarding by the relay device 300 at block 708 may include forwarding by the ASR component 146, the modem 144, the processor 312, the transceiver 302, and/or the memory 316 of the relay device 300, a signal between a first wireless device (e.g., base station 105) and a second wireless device (e.g., UE 110) based on the configuring.

Figure 8:
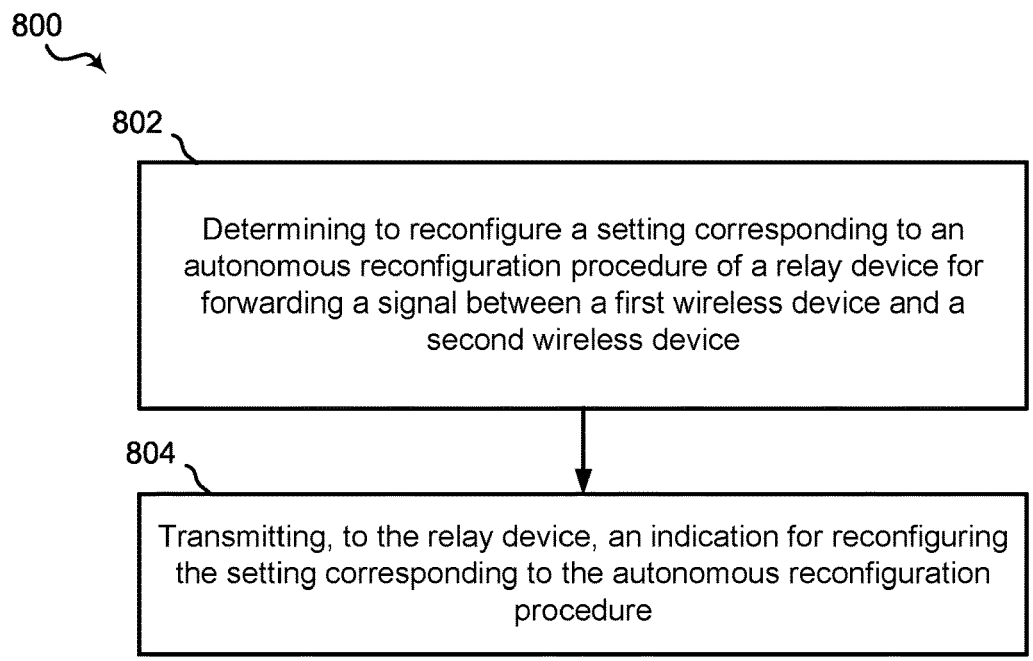
FIG. 8 is flowchart of another example method performed by a control entity of FIG. 1, according to aspects of the present disclosure.

Referring to FIG. 8, an example of a method 800 for configuring an autonomously smart repeater may be performed by the control entity component 142, the modem 140, the transceiver 202, the processor 212, the memory 216, and or any other component/subcomponent of the control entity 200 of the wireless communication network 100.

At block 802, the method 800 may include determining to reconfigure a setting corresponding to an autonomous reconfiguration procedure of a relay device for forwarding a signal between a first wireless device and a second wireless device. For example, the control entity component 144, the modem 140, the transceiver 202, the processor 212, and/or the memory 216 of the control entity 200, and/or one or more additional components/subcomponents of the control entity 200 may be configured to or may comprise means for determining to reconfigure a setting corresponding to an autonomous reconfiguration procedure of a relay device for forwarding a signal between a first wireless device and a second wireless device.

For example, the determining at block 802 may include determining by the control entity component 144, the modem 140, the transceiver 202, the processor 212, and/or the memory 216 of the control entity 200, to the relay device 300, to reconfigure a setting corresponding to an autonomous reconfiguration procedure of the relay device 300 for forwarding a signal 610 or 612 between a first wireless device (e.g., base station 105) and a second wireless device (e.g., UE 110).

In an example, the control entity 200 may determine to reconfigure a setting based on, for example, a need for one or more conditions (e.g., fixed transmission power or unchanged beam directions) for an upcoming communication/procedure that need to be reconfigured as indicated by, for example communication scheduling. In another example, the control entity 200 may determine to reconfigure a setting based on, for example, knowledge (obtained, for example, through scheduling) that an autonomously smart repeater (e.g., relay device 300) may possibly change a configuration that would lead to a required condition not being met.

At block 804, the method 800 may include transmitting, to the relay device, an indication for reconfiguring the setting corresponding to the autonomous reconfiguration procedure. For example, the control entity component 144, the modem 140, the transceiver 202, the processor 212, and/or the memory 216 of the control entity 200, and/or one or more additional components/subcomponents of the control entity 200 may be configured to or may comprise means for transmitting, to the relay device, an indication for reconfiguring the setting corresponding to the autonomous reconfiguration procedure.

For example, the transmitting the indication at block 804 may include transmitting by the control entity component 144, the modem 140, the transceiver 202, the processor 212, and/or the memory 216 of the control entity 200, to the relay device 300, an indication 610 for reconfiguring the setting corresponding to the autonomous reconfiguration procedure. For example, the control entity 200 may indicate to the repeater (e.g., relay device 300) some information including indication 610 to make sure the setting will be as expected, based on the one or more conditions and/or the configuration change of the repeater (e.g., relay device 300) as described herein.

Additional Implementations

An example method of wireless communication by a relay device, comprising: receiving, from a first entity, an indication for reconfiguring a parameter corresponding to an autonomous reconfiguration procedure of the relay device; configuring a setting of the autonomous reconfiguration procedure according to the parameter; and forwarding a signal between a first wireless device and a second wireless device based on the configuring.

The above example method, further comprising: transmitting, to the first entity, a message indicating capabilities of the relay device corresponding to the autonomous reconfiguration procedure, wherein the parameter is selected based on the capabilities of the relay device.

One or more of the above example methods, wherein the configuring the setting comprises one or more of enabling or disabling the autonomous reconfiguration procedure, activating or deactivating an amplification chain of the relay device, selecting a transmission beamforming configuration or a receiving beamforming configuration, or modifying a power amplification setting.

One or more of the above example methods, wherein the configuring the setting comprises configuring or maintaining a phase continuity setting.

One or more of the above example methods, further comprising: receiving a second indication of a set of consecutive symbols or slots for maintaining a configuration of the setting; and maintaining the setting based on the second indication.

One or more of the above example methods, wherein the configuring the setting comprises configuring or maintaining a quasi-colocation relation setting.

One or more of the above example methods, wherein the parameter is indicated in a designated set of resources for forwarding the signal.

One or more of the above example methods, wherein the first entity is one of the first wireless device or the second wireless device.

One or more of the above example methods, wherein the autonomous reconfiguration procedure allows the relay device to acquire or infer information to forward communications between wireless devices including the first wireless device and the second wireless device.

A second example method of wireless communication by a control entity, comprising: determining to reconfigure a setting corresponding to an autonomous reconfiguration procedure of a relay device for forwarding a signal between a first wireless device and a second wireless device; and transmitting, to the relay device, an indication for reconfiguring the setting corresponding to the autonomous reconfiguration procedure.

The above second example method, further comprising: receiving, from the relay device, a message indicating capabilities of the relay device corresponding to the autonomous reconfiguration procedure, wherein the setting is selected based on the capabilities of the relay device.

One or more of the above second example methods, wherein the setting is associated with one or more of enabling or disabling the autonomous reconfiguration procedure, activating or deactivating an amplification chain of the relay device, selecting a transmission beamforming configuration or a receiving beamforming configuration, or modifying a power amplification setting.

One or more of the above second example methods, wherein the setting is associated with configuring or maintaining a phase continuity setting.

One or more of the above second example methods, further comprising: transmitting, to the relay device, a second indication of a set of consecutive symbols or slots for maintaining a configuration of the setting.

One or more of the above second example methods, wherein the setting is associated with configuring or maintaining a quasi-colocation relation setting.

One or more of the above second example methods, wherein the indication is indicated in a designated set of resources for the signal to be forwarded by the relay device.

One or more of the above second example methods, wherein the control entity is one of the first wireless device or the second wireless device.

An example relay device, comprising: a memory storing instructions; and a processor communicatively coupled with the memory and configured to: receive, from a first entity, an indication for reconfiguring a parameter corresponding to an autonomous reconfiguration procedure of the relay device; configure a setting of the autonomous reconfiguration procedure according to the parameter; and forward a signal between a first wireless device and a second wireless device based on the configuring.

The above example relay device, wherein the processor is further configured to: transmit, to the first entity, a message indicating capabilities of the relay device corresponding to the autonomous reconfiguration procedure, wherein the parameter is selected based on the capabilities of the relay device.

One or more of the above example relay devices, wherein the setting corresponds to one or more of enabling or disabling the autonomous reconfiguration procedure, activating or deactivating an amplification chain of the relay device, selecting a transmission beamforming configuration or a receiving beamforming configuration, or modifying a power amplification setting.

One or more of the above example relay devices, wherein the setting corresponds to configuring or maintaining a phase continuity setting or a quasi-colocation relation setting.

One or more of the above example relay devices, wherein the processor is further configured to: receive a second indication of a set of consecutive symbols or slots for maintaining a configuration of the setting; and maintain the setting based on the second indication.

One or more of the above example relay devices, wherein the parameter is indicated in a designated set of resources for forwarding the signal.

One or more of the above example relay devices, wherein the first entity is one of the first wireless device or the second wireless device.

An example control entity, comprising: a memory storing instructions; and a processor communicatively coupled with the memory and configured to: determine to reconfigure a setting corresponding to an autonomous reconfiguration procedure of a relay device for forwarding a signal between a first wireless device and a second wireless device; and transmit, to the relay device, an indication for reconfiguring the setting corresponding to the autonomous reconfiguration procedure.

The above example control entity, wherein the processor is further configured to: receive, from the relay device, a message indicating capabilities of the relay device corresponding to the autonomous reconfiguration procedure, wherein the setting is selected based on the capabilities of the relay device.

One or more of the above example control entities, wherein the setting is associated with one or more of enabling or disabling the autonomous reconfiguration procedure, activating or deactivating an amplification chain of the relay device, selecting a transmission beamforming configuration or a receiving beamforming configuration, modifying a power amplification setting, configuring or maintaining a phase continuity setting, or configuring or maintaining a quasi-colocation relation setting.

One or more of the above example control entities, wherein the processor is further configured to: transmit, to the relay device, a second indication of a set of consecutive symbols or slots for maintaining a configuration of the setting.

One or more of the above example control entities, wherein the indication is indicated in a designated set of resources for the signal to be forwarded by the relay device.

One or more of the above example control entities, wherein the control entity is one of the first wireless device or the second wireless device.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by an autonomously smart relay device, comprising:
    transmitting, to a first entity, a message indicating capabilities of the relay device corresponding to an autonomous reconfiguration procedure;
    receiving, from a first entity, an indication for reconfiguring a parameter corresponding to an autonomous reconfiguration procedure of the relay device, with the parameter being selected by the first entity and based on the capabilities of the relay device;
    configuring a setting of the autonomous reconfiguration procedure according to the parameter to improve end-to-end performance for communications via the relay device and the parameter controlling the autonomous reconfiguration procedure; and
    forwarding a signal between a first wireless device and a second wireless device based on the configuring via the relay device;
    wherein the configuring the setting comprises configuring or maintaining a phase continuity setting of the signal forwarded by the relay device between the first wireless device and the second wireless device.

2. The method of claim 1, wherein the configuring the setting comprises one or more of enabling or disabling the autonomous reconfiguration procedure, activating or deactivating an amplification chain of the relay device, selecting a transmission beamforming configuration or a receiving beamforming configuration, or modifying a power amplification setting.

3. The method of claim 1, further comprising:
receiving a second indication of a set of consecutive symbols or slots for maintaining a configuration of the setting; and
maintaining the setting based on the second indication.

4. The method of claim 1, wherein the configuring the setting comprises configuring or maintaining a quasi-colocation relation setting for the signal being forward between the first wireless device and the second wireless device.

5. The method of claim 1, wherein the parameter is indicated in a designated set of resources for forwarding the signal.

6. The method of claim 1, wherein the first entity is one of the first wireless device or the second wireless device.

7. The method of claim 1, wherein the autonomous reconfiguration procedure allows the relay device to acquire or infer information to forward communications between wireless devices including the first wireless device and the second wireless device.

8. An autonomously smart relay device, comprising:
a memory storing instructions; and
a processor communicatively coupled with the memory and configured to:
transmit, to a first entity, a message indicating capabilities of the relay device corresponding to an autonomous reconfiguration procedure;
receive, from a first entity, an indication for reconfiguring a parameter corresponding to an autonomous reconfiguration procedure of the relay device, with the parameter being selected by the first entity and based on the capabilities of the relay device;
configure a setting of the autonomous reconfiguration procedure according to the parameter to improve end-to-end performance for communications via the relay device and the parameter controlling the autonomous reconfiguration procedure; and
forward a signal between a first wireless device and a second wireless device based on the configuring via the relay device;
wherein the configuring the setting comprises configuring or maintaining a phase continuity setting of the signal forwarded by the relay device between the first wireless device and the second wireless device.

9. The relay device of claim 8, wherein the setting corresponds to one or more of enabling or disabling the autonomous reconfiguration procedure, activating or deactivating an amplification chain of the relay device, selecting a transmission beamforming configuration or a receiving beamforming configuration, or modifying a power amplification setting.

10. The relay device of claim 8, wherein the setting corresponds to configuring or maintaining a quasi-colocation relation setting of the signal forwarded by the relay device between the first wireless and the second wireless device.

11. The relay device of claim 8, wherein the processor is further configured to:
receive a second indication of a set of consecutive symbols or slots for maintaining a configuration of the setting; and
maintain the setting based on the second indication.

12. The relay device of claim 8, wherein the parameter is indicated in a designated set of resources for forwarding the signal.

13. The relay device of claim 8, wherein the first entity is one of the first wireless device or the second wireless device.

* * * * *